Patented June 28, 1932

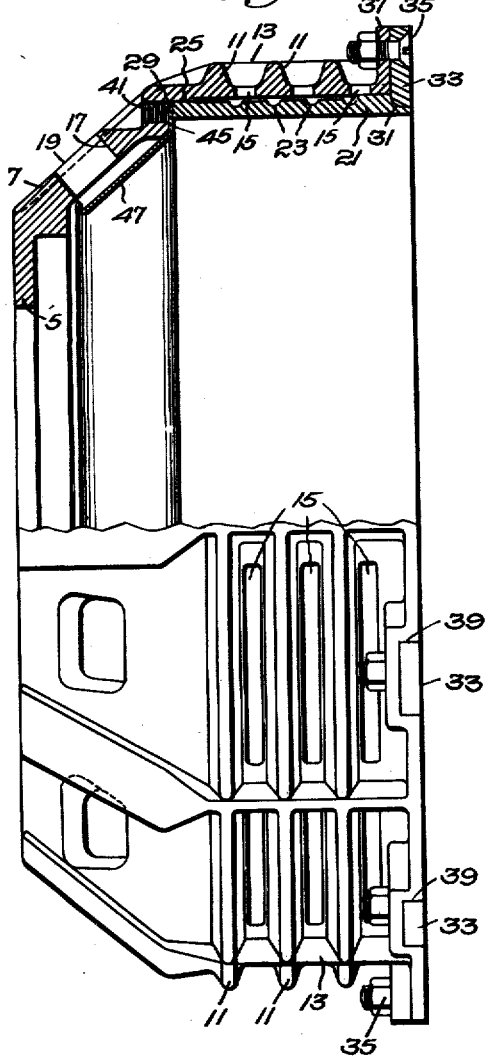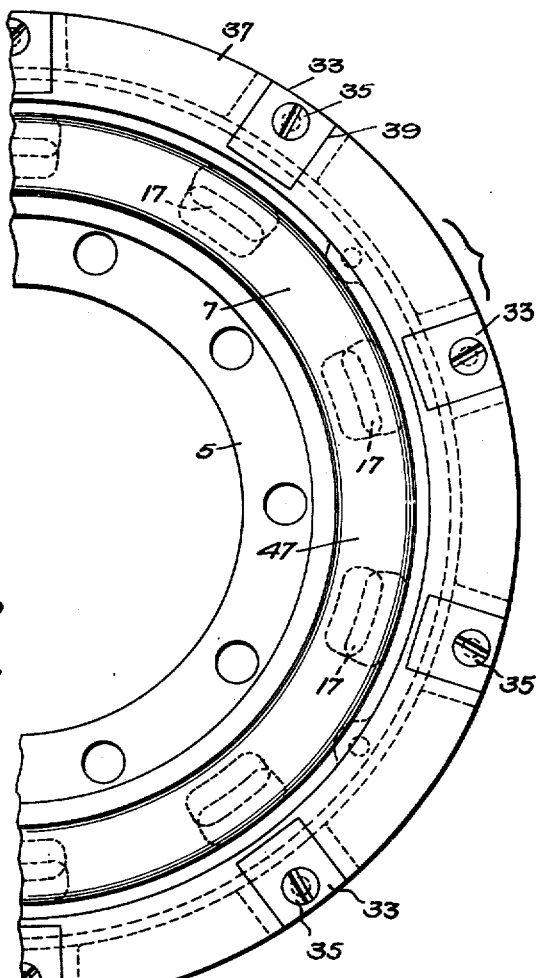

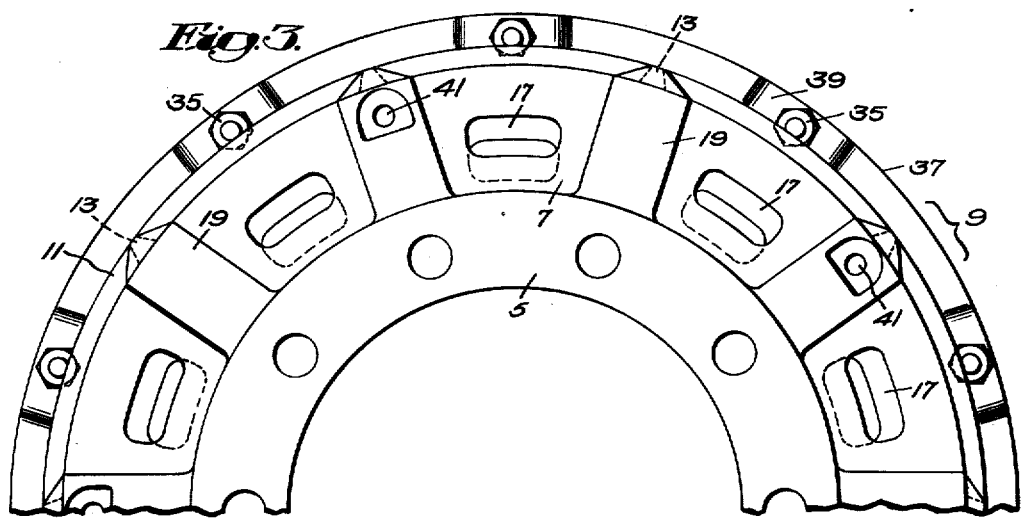
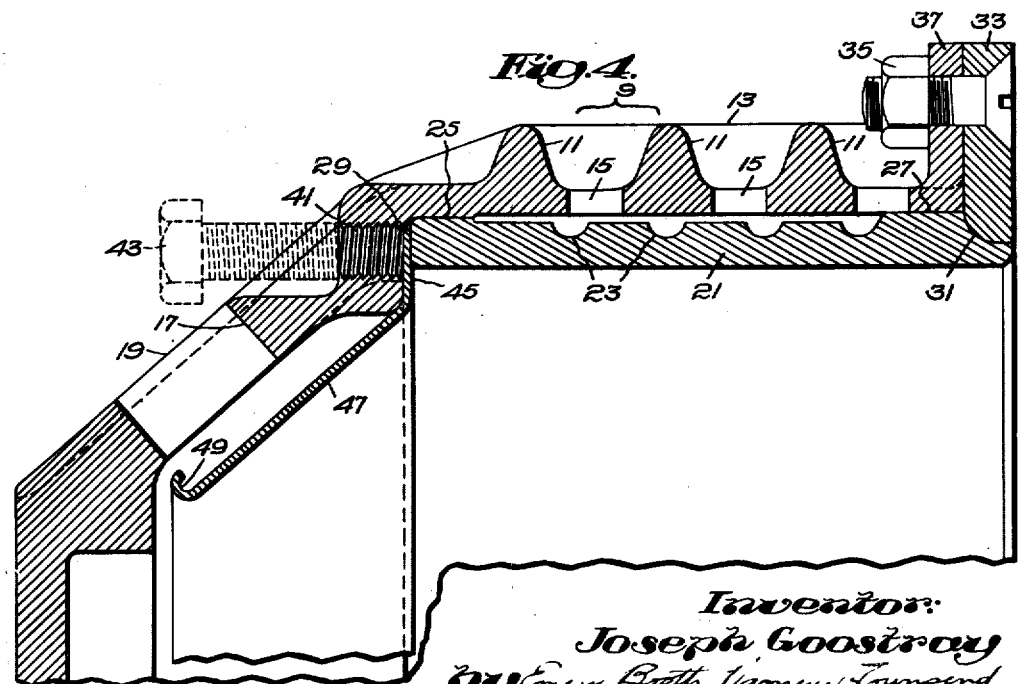

1,865,312

UNITED STATES PATENT OFFICE

JOSEPH GOOSTRAY, OF EAST MILTON, MASSACHUSETTS, ASSIGNOR TO HUNT-SPILLER MANUFACTURING CORPORATION, OF BOSTON, MASSACHUSETTS, A CORPORATION OF MASSACHUSETTS

BRAKE DRUM

Application filed May 25, 1931. Serial No. 539,650.

This invention relates to brake drums and the object is to provide certain improvements in construction more particularly applicable to drums having a renewable braking surface. The invention finds a particular application to use on heavy automotive vehicles such as busses and trucks.

My invention will be well understood by reference to the following description of an illustrative embodiment thereof taken in connection with the accompanying drawings, wherein:—

Fig. 1 is an end elevation of a brake drum with part broken away;

Fig. 2 is a partial side elevation of the brake drum as seen from the left of Fig. 1;

Fig. 3 is a partial side elevation as seen from the right of Fig. 1; and

Fig. 4 is an enlarged section.

The drum shown in the drawings comprises a supporting body to which is fitted a renewable liner which provides the active braking surface. The supporting body herein shown is conveniently formed of cast steel and may comprise an attaching flange 5, adapted to be bolted to the wheel, from which rises the perforated annular web 7 carrying a cylindrical portion 9 adapted to support the braking surface proper for cooperation with brake shoes of the internal expanding type.

The cylindrical portion 9 preferably is skeletonized and herein is shown as formed by deep intersecting circumferential ribs 11 and transverse ribs 13 defining spaces between them which are open-bottomed to provide through openings 15 to the interior surface of the cylindrical portion. The web 7 may be pierced with openings 17 to lighten it and more particularly provide for ventilation, and is preferably reinforced by ribs 19 which may extend and merge into the transverse ribs 13. The construction of the body described embodies principles disclosed in my Patent No. 1,775,521, dated September 9, 1930, and realizes many of the advantages thereof.

The actual braking surface is provided by a liner 21, preferably of cast iron, the wearing qualities of which are well known. It takes the form generally of a cylindrical annulus removably fitted to the interior circumference of the cylindrical portion 9, the outer circumference of the liner 21 being presented to the openings and it being therefore cooled on account of ventilation through these openings.

Herein the liner 21 is supported at its margins and preferably the interior diameter of the cylindrical portion 9 of the supporting body is substantially greater than the exterior diameter of the central portion of the liner 21 so that there is a clearance therebetween as seen in Fig. 4, through which air may circulate. The back of the liner 21 may also be provided with suitable grooves 23 whereby it is relatively stiff for a given weight while circulation of cooling air is promoted.

Herein the inner margin of the cylindrical portion 9 is formed with a seat 25 of relatively small diameter and the outer margin with a seat 27 of relatively great diameter, the marginal portions of the liner 21 being of dimensions to cooperate with these seats. The liner may thus be inserted from the right in Fig. 3 freely without effort and without strain on the parts, there being a clearance between the interior surface of the liner and the interior surface of the supporting body, until the cooperating seats approach opposition. The liner may then be forced home until its right hand end, viewing Figs. 1 and 4, contacts with an annular, substantially radial seat 29 at the inner side of the cylindrical portion and will be firmly supported throughout its circumference at the margins. The construction of liner and its method of support as heretofore described are like those described and claimed in my application Serial No. 529,341, filed April 11, 1931.

To retain the liner in position the outer end may be provided with recesses 31 in which fit the ends of keys 33 secured by means of the bolts 35 to the supporting body. Herein the cylindrical portion 9 of this body is provided with a flange 37 offset at intervals to form pockets 39 (see Fig. 1) in which the keys are seated. By this means the liner is not only held in position but kept from rotation.

An important advantage of the construction is that the liner is substantially in the form of a cylindrical shell with only minor differences in diameter. When cast several liners may be made in a single casting, the casting resembling a section of pipe. This casting may be chucked in a lathe for machining and thereafter divided transversly into a suitable number of liners.

To facilitate the removal of the liner the body portion is preferably provided with openings 41 intersecting the radial shoulder 29. These openings may be threaded as shown, and if it is desired to remove the liner, screws 43 may be screwed into the openings 41. Their ends will engage the inner end of the liner 21 and they will thus serve as pushing tools to start the liner from its seat.

The ventilation of brake drums by the provision of such openings as are here shown at 17 in spite of its well demonstrated advantages is sometimes objected to on the ground that road dirt may more readily be thrown up on the braking surfaces. The construction shown, while providing for efficient ventilation, permits the convenient incorporation in the structure of a guard to prevent the access of dirt to the braking surfaces while preserving the advantages of ventilation without undue impairment. I have herein shown a dirt screen preferably in the form of a separate member pressed from sheet metal and having a radial flange 45 from the inner circumference of which rises a frusto-conical body 47, the extremity of which may be recurved in the form of a gutter 49. The flange 45 is adapted to be assembled between the seat 29 and the inner end of the liner 21, the liner holding it firmly in position. When so held, the part 47 extends in opposition to but spaced away from the openings 17. Dirt thrown in through the openings will thus strike the guard 47 and the greater portion thereof will simply rebound out through the openings again, since it is thrown in with considerable velocity, or will be thrown as the wheel continues to revolve. The recurved edge 49 will effectually prevent dirt from passing around the end of the guard to the braking surfaces. At the same time the guard does not unduly obstruct the circulation of air.

I am aware that the invention may be embodied in other specific forms without departing from the spirit or essential attributes thereof, and I therefore desire the present embodiment to be considered in all respects as illustrative and not restrictive; reference being had to the appended claims rather than to the foregoing description to indicate the scope of the invention.

Claims:

1. A brake drum comprising a supporting body having a perforated annular web and a cylindrical flange, a liner supported on said flange and a shield held between said body and liner and opposing the perforations of said web.

2. A brake drum comprising a supporting body of cast metal having a perforated annular web and a cylindrical flange overhung therefrom, the inner face of said flange having a seat to support a liner, there being also a substantially radial seat to oppose an end of the liner, a liner, an annular guard having a part received between said latter seat and the liner and opposing the perforations of the web and mechanical means for securing the liner in position.

3. A brake drum comprising an attaching web, a cylindrical portion overhanging therefrom and provided with cylindrical and annular seats for the outer end edge portions of a removable liner, a liner substantially in the form of a cylindrical shell having recesses in its outer end and keys secured to the body engaging in said recesses.

4. A brake drum comprising an attaching web, a cylindrical portion overhanging therefrom and provided with cylindrical and annular seats for the outer and edge portions of a removable liner, a liner substantially in the form of a cylindrical shell having recesses in its outer end, corresponding radial recesses at the outer end of said body, keys in the recesses and means for mechanically securing the keys to the body.

5. A brake drum comprising a body having an attaching web and a cylindrical portion overhanging therefrom having an inner marginal seat of relatively small diameter and an outer marginal seat of relatively great diameter and an inner radial seat and a cast metal liner substantially in the form of a cylindrical shell having seats to cooperate with said marginal seats on its exterior surface, said liner constructed to enter said body face with a clearance until said seats come together, means cooperating with the outer end of said liner to secure it in position, said body having openings intersecting the radial seat for access of a pushing implement to the inner end of the liner for removing the same.

6. A brake drum comprising a body having an attaching web and a cylindrical portion overhanging therefrom having an inner marginal seat of relatively small diameter and an outer marginal seat of relatively great diameter and an inner radial seat and a cast metal liner substantially in the form of a cylindrical shell having seats to cooperate with said marginal seats on its exterior surface, said liner constructed to enter said body with a clearance until said seats come together, the outer end of said liner being recessed, keys secured to the body entering the recesses, said body having openings intersecting the radial seat for access of a pushing implement to the inner end of the liner for removing the same.

7. A brake drum comprising a body having an attaching web and a cylindrical portion overhanging therefrom, the interior of said portion presenting a seat and there being a substantially radial seat at the inner side thereof, a removable liner of cast metal having an outer and an end surface to cooperate with said seats, mechanical fastening devices securing said liner to said seats, said body having openings intersecting the radial seat for access of a pushing implement to the inner end of the liner for removing the same.

In testimony whereof, I have signed my name to this specification.

JOSEPH GOOSTRAY.

CERTIFICATE OF CORRECTION.

Patent No. 1,865,312.            June 28, 1932.

JOSEPH GOOSTRAY.

It is hereby certified that error appears in the printed specification of the above numbered patent requiring correction as follows: Page 2, line 82, claim 3, for "end" read and; and that the said Letters Patent should be read with this correction therein that the same may conform to the record of the case in the Patent Office.

Signed and sealed this 11th day of October, A. D. 1932.

M. J. Moore,
Acting Commissioner of Patents.

(Seal)

an attaching web and a cylindrical portion overhanging therefrom, the interior of said portion presenting a seat and there being a substantially radial seat at the inner side thereof, a removable liner of cast metal having an outer and an end surface to cooperate with said seats, mechanical fastening devices securing said liner to said seats, said body having openings intersecting the radial seat for access of a pushing implement to the inner end of the liner for removing the same.

In testimony whereof, I have signed my name to this specification.

JOSEPH GOOSTRAY.

CERTIFICATE OF CORRECTION.

Patent No. 1,865,312. June 28, 1932.

JOSEPH GOOSTRAY.

It is hereby certified that error appears in the printed specification of the above numbered patent requiring correction as follows: Page 2, line 82, claim 3, for "end" read and; and that the said Letters Patent should be read with this correction therein that the same may conform to the record of the case in the Patent Office.

Signed and sealed this 11th day of October, A. D. 1932.

M. J. Moore,
Acting Commissioner of Patents.

(Seal)

CERTIFICATE OF CORRECTION.

Patent No. 1,865,312.                                          June 28, 1932.

JOSEPH GOOSTRAY.

It is hereby certified that error appears in the printed specification of the above numbered patent requiring correction as follows: Page 2, line 82, claim 3, for "end" read and; and that the said Letters Patent should be read with this correction therein that the same may conform to the record of the case in the Patent Office.

Signed and sealed this 11th day of October, A. D. 1932.

(Seal)                                                  M. J. Moore,
                                                         Acting Commissioner of Patents.